(12) United States Patent
Lam et al.

(10) Patent No.: US 8,693,866 B1
(45) Date of Patent: Apr. 8, 2014

(54) FIBER DIAGNOSIS SYSTEM FOR WDM OPTICAL ACCESS NETWORKS

(75) Inventors: Cedric F. Lam, Milpitas, CA (US); Ben W. Segura, Morgan Hill, CA (US); Ryohei Urata, Sunnyvale, CA (US); Hong Liu, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 160 days.

(21) Appl. No.: 13/355,233

(22) Filed: Jan. 20, 2012

(51) Int. Cl.
*H04B 10/00* (2013.01)

(52) U.S. Cl.
USPC .............. 398/21; 398/14; 398/16; 398/20; 398/13

(58) Field of Classification Search
USPC .......................... 398/66–73, 9–21
See application file for complete search history.

(56) References Cited

U.S. PATENT DOCUMENTS

| | | | | |
|---|---|---|---|---|
| 5,285,305 A | * | 2/1994 | Cohen et al. | 398/31 |
| 5,440,416 A | * | 8/1995 | Cohen et al. | 398/82 |
| 5,926,298 A | * | 7/1999 | Li | 385/24 |
| RE36,471 E | * | 12/1999 | Cohen | 398/82 |
| 6,028,661 A | * | 2/2000 | Minami et al. | 356/73.1 |
| 6,310,702 B1 | * | 10/2001 | Minami et al. | 398/13 |
| 6,396,573 B1 | * | 5/2002 | Pimpinella | 356/73.1 |
| 6,396,575 B1 | * | 5/2002 | Holland | 356/73.1 |
| 6,512,610 B1 | * | 1/2003 | Takeuchi et al. | 398/21 |
| 6,650,840 B2 | * | 11/2003 | Feldman | 398/21 |
| 7,340,170 B2 | * | 3/2008 | Park et al. | 398/67 |
| 7,536,102 B1 | * | 5/2009 | Huffman et al. | 398/21 |
| 7,542,673 B2 | * | 6/2009 | Chung et al. | 398/14 |
| 7,555,215 B2 | * | 6/2009 | Nakamura et al. | 398/72 |
| 7,715,718 B2 | * | 5/2010 | Smith et al. | 398/72 |
| 7,800,744 B2 | * | 9/2010 | Lai et al. | 356/73.1 |
| 7,835,604 B2 | * | 11/2010 | Uemura et al. | 385/37 |
| 8,050,556 B2 | * | 11/2011 | Effenberger | 398/21 |
| 8,077,298 B2 | * | 12/2011 | Wang et al. | 356/73.1 |
| 8,175,454 B2 | * | 5/2012 | Xia et al. | 398/21 |
| 8,270,828 B2 | * | 9/2012 | Nakajima et al. | 398/28 |
| 8,290,363 B2 | * | 10/2012 | Nakajima et al. | 398/13 |
| 8,306,417 B2 | * | 11/2012 | Chang et al. | 398/12 |
| 8,311,409 B2 | * | 11/2012 | Chang et al. | 398/33 |

(Continued)

OTHER PUBLICATIONS

"Optical Network Management System, Remote Testing, Network Monitoring, and Service Provisioning Solution for High-Quality Network Performance", Retrieved from the internet: <http://www.jdsu.com/ProductLiterature/onms_br_fop_tm_ae.pdf>, 2005, 8 pages, JDSU Uniphase Corporation.

(Continued)

*Primary Examiner* — Agustin Bello
(74) *Attorney, Agent, or Firm* — Blakely Sokoloff Taylor & Zafman LLP

(57) ABSTRACT

A technique for detecting a fiber fault in a WDM optical access network includes launching a test signal into a fiber trunk line linking a central office ("CO") to a remote node ("RN") of the WDM optical access network. The test signal is generated by an optical time domain reflectometry unit to simultaneously fault test fiber access lines linking the RN to customer premises. The test signal is separated from downstream WDM signals at the RN. The test signal is power split at the RN into a plurality of access line test signals. The access line test signals are each recombined with a corresponding one of the downstream WDM signals onto a corresponding one of the fiber access lines. Test signal reflections are received at the CO from the fiber access lines as a reflection signature and analyzed to identify a location of the fiber fault.

21 Claims, 6 Drawing Sheets

(56) References Cited

U.S. PATENT DOCUMENTS

| | | | | |
|---|---|---|---|---|
| 8,411,259 | B2* | 4/2013 | Levin et al. | 356/73.1 |
| 8,483,562 | B2* | 7/2013 | Wellbrock et al. | 398/71 |
| 8,509,613 | B2* | 8/2013 | Chung et al. | 398/17 |
| 2009/0257743 | A1* | 10/2009 | Chung et al. | 398/21 |
| 2009/0263122 | A1* | 10/2009 | Helkey et al. | 398/7 |
| 2011/0255860 | A1* | 10/2011 | Lee et al. | 398/12 |
| 2011/0311220 | A1* | 12/2011 | Nakajima et al. | 398/20 |
| 2012/0039598 | A1* | 2/2012 | Dahlfort | 398/13 |
| 2012/0163800 | A1* | 6/2012 | Urban | 398/12 |

OTHER PUBLICATIONS

NetCracker, "Comprehensive Telecom Operations and Management Solutions, Product Overview", 2010, 2 pages, NetCracker Technology Corp.

"ONMS PON Centralized Remote PON Test System", <http://www.jdsu.com/product-literature/onmspon_br_fop_tm_ae.pdf>, Jun. 2009, 4 pages, JDSU Uniphase Corporation.

"Homodyne detection", From Wikipedia, the free encyclopedia, <http://en.wikipedia.org/wiki/Homodyne_detection> retrieved from Internet on Jul. 11, 2011, 1 page.

Optical heterodyne detection, From Wikipedia, the free encyclopedia, <http://en.wikipedia.org/wiki/Optical_heterodyne_detection> retrieved from Internet on Jul. 11, 2011, 5 pages.

Lam, Cedric F. et al., "Installation of Fiber-to-the-Premise Using Optical Demarcation Devices", U.S. Appl. No. 12/941,766, filed Nov. 8, 2010.

Lam, Cedric F. et al., "Fiber Diagnosis System for Point-to-Point Optical Access Networks", U.S. Appl. No. 12/985,041, filed Jan. 5, 2011.

Lam, Cedric F. et al., "Detection of Fiber Faults in Optical Fiber Networks", U.S. Appl. No. 13/040,983, filed Mar. 4, 2011.

Lam, Cedric F., "Migratable Wavelength Division Multiplexing Passive Optical Network", U.S. Appl. No. 13/205,055, filed Aug. 8, 2011.

Lam, Cedric F. et al., "Passive Optical Network With Asymmetric Modulation Scheme", U.S. Appl. No. 13/288,555, filed Nov. 3, 2011.

* cited by examiner

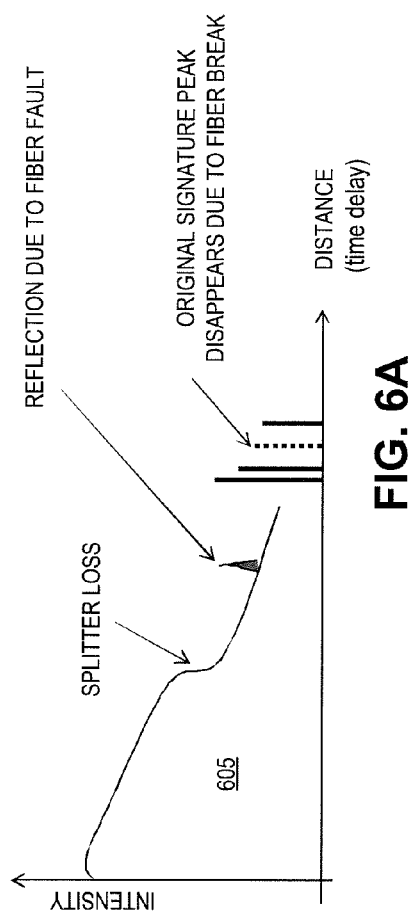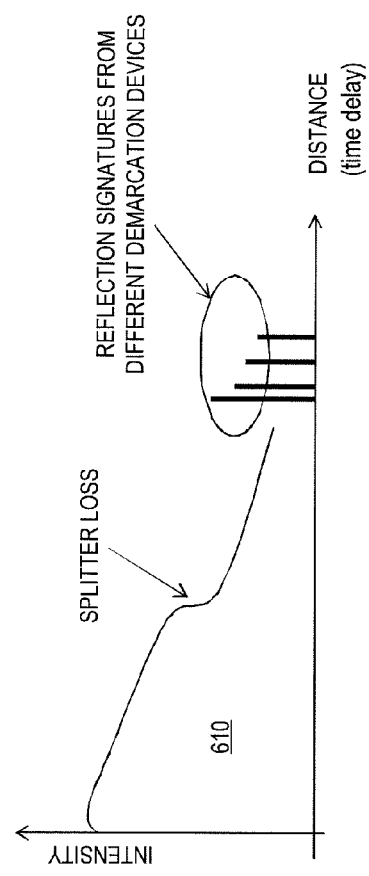

FIBER DIAGNOSIS SYSTEM FOR WDM OPTICAL ACCESS NETWORKS

TECHNICAL FIELD

This disclosure relates generally to optical networking, and in particular but not exclusively, relates to the detection of fiber faults in optical access networks.

BACKGROUND INFORMATION

Optical access networks can be used to deliver high bandwidth communication services to the home or premise. One such optical access network is broadband fiber-to-the-premise ("FTTP"). FTTP has been regarded as the ultimate form of broadband access offering very high bandwidths to end-users. Today's FTTP systems are mostly offered through point-to-multipoint time division multiplexed ("TDM") passive optical networks ("PONs") or through point-to-point ("pt-2-pt") optical Ethernets with individual home-run fibers.

TDM PONs use a 1:N power splitter (e.g., Ethernet-PON, Gigabit-PON, and 10G versions of these systems) at a remote node ("RN") in the field to share a common transceiver at the central office ("CO"). TDM-PONs provide beneficial savings in the number of trunk fibers (between RN and CO) and optical transceiver counts at the CO. While saving patch panel space to terminate fibers, TDM-PONs do not scale well with bandwidth growth. Pt-2-pt optical networks provide very high bandwidths to end users, but do not scale well with optical fiber termination at the CO and fiber counts.

A wavelength division multiplexed ("WDM") PON is another approach, which provides the benefit of fiber consolidation and pt-2-pt virtual links to end-users by assigning separate wavelengths between the CO and individual users. It can offer the benefits of both TDM-PON and pt-2-pt architectures. Traditional WDM-PON systems use a wavelength demultiplexer (as opposed to the power splitter used in TDM-PON) at the RN in the field to distribute a separate wavelength to each end-user in each direction.

In order to promote widespread adoption of FTTP broadband infrastructures, it is desirable to reduce the costs associated with fiber plant construction and ongoing operation and maintenance. One such expense is the detection and location of fiber faults (e.g., a fiber cut or breakage) that interrupt communication services. Such detection is necessary for repairing the broken fiber link and restoring the communication services. Techniques that can quickly and efficiently detect and locate these faults reduce the operation and maintenance expenses and further encourage adoption of FTTP communication services. In addition, these techniques shorten service outage time and improve user experiences.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIGS. 6A & 6B include charts illustrating demonstrative operation of an OTDR diagnostic process, in accordance with an embodiment of the disclosure.

DETAILED DESCRIPTION

Embodiments of a system and method of operation of a fiber diagnosis system for a wavelength division multiplexing ("WDM") optical access network are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FTTP deployment is so capital intensive that many broadband access infrastructure providers are feverishly looking for methods to lower the deployment cost and the ensuing operating cost. OTDR is a measurement technique used to quickly and efficiently diagnose a fiber plant and identify the location of a fiber fault that brings down or otherwise degrades a transmission link within the fiber plant. OTDR can be applied to a faulty fiber link to localize faults such as a fiber cut, a macro bend, etc. OTDR gives the physical distance of the fiber fault (called events) from the source where the OTDR test signal is launched. When combined with geographic information system ("GIS") data regarding the physical routes of the fiber plant and knowledge of which customer has lost communication with the central office ("CO") providing the communication services, OTDR can be leveraged to quickly and efficiently identify and map the fiber fault location. As such, an effective fault diagnosis strategy that leverages the advantages of OTDR can help reduce the operating costs of an FTTP access network.

Figure 1:
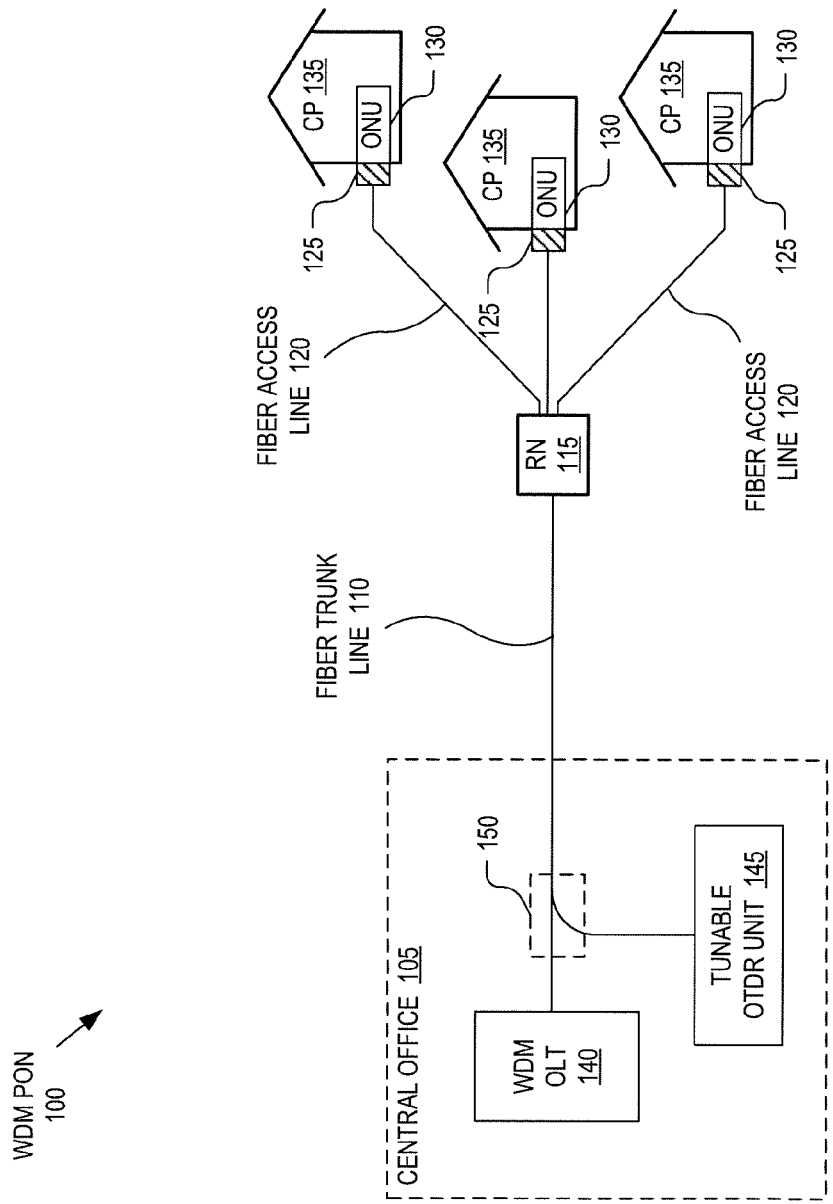
FIG. 1 is a functional block diagram of wavelength division multiplexing ("WDM") passive optical network ("PON") provided with a tunable optical time domain reflectometry ("OTDR") unit, in accordance with an embodiment of the disclosure.

FIG. 1 is a functional block diagram of wavelength division multiplexing ("WDM") passive optical network ("PON") 100 provided with a tunable optical time domain reflectometry ("OTDR") unit. The illustrated implementation of WDM PON 100 includes a CO 105, a fiber trunk line 110, a remote node ("RN") 115, fiber access lines 120, demarcation devices 125, and optical network units ("ONUs") 130 at CPs 135. The illustrated implementation of CO 105 includes a WDM optical line terminal ("OLT") 140, a tunable OTDR unit 145, and a broadband coupler 150. OLT 140 may include a media access controller ("MAC"), an optical transceiver array, and a wavelength interleaving multiplexer/demultiplexer ("MUX/DEMUX") (all of which are not illustrated).

OLT 140 serves two primary functions: 1) performing optical-to-electrical and electrical-to-optical conversions between the service provider's equipment and the PON and 2) coordinating multiplexing with ONUs 130 at the other end of the PON. Of course, OLT 140 performs wavelength division multiplexing between ONUs 130 and may service a number of CPs 135 (e.g., 32, 64, 128, etc.). While CO 105 is illustrated as including only a single OLT 140, in practice CO 105 may include many OLTs 140 to service thousands of CPs 135 (e.g., 50,000) with the MACs of each OLT 140 multiplexed via an aggregation node (not illustrated).

Fiber trunk line 110 extends from CO 105 to RN 115 located within a neighborhood of CPs 135, which represent potential or existing customers of the service provider. RN 115 includes a wavelength MUX/DEMUX to route the downstream WDM signals to CPs 135 and combine the upstream WDM signals onto fiber trunk line 110. From RN 115, individual fiber access lines 120 extend to corresponding CPs 135. Fiber access lines 120 may be terminated at demarcation devices 125. Demarcation devices 125 may be located on a side of the CP where the fiber access line enters the building or in an access box or hand hole near the customer's property line (e.g., in a utility right-of-way). Demarcation devices 125 provide a well-defined demarcation identification point between the customer premise equipment ("CPE") including ONU 130 and the carrier's fiber plant. Demarcation devices 125 may serve to demark the terminal point of maintenance responsibility for the carrier. Both fiber trunk line 110 and fiber access lines 120 may run along a utility right-of-way running adjacent to a neighborhood street. Fiber trunk line 110 and fiber access lines 120 may be a subterranean fiber plant, a suspended fiber plant (e.g., suspended along telephone poles), a combination thereof, or otherwise.

Figure 3:
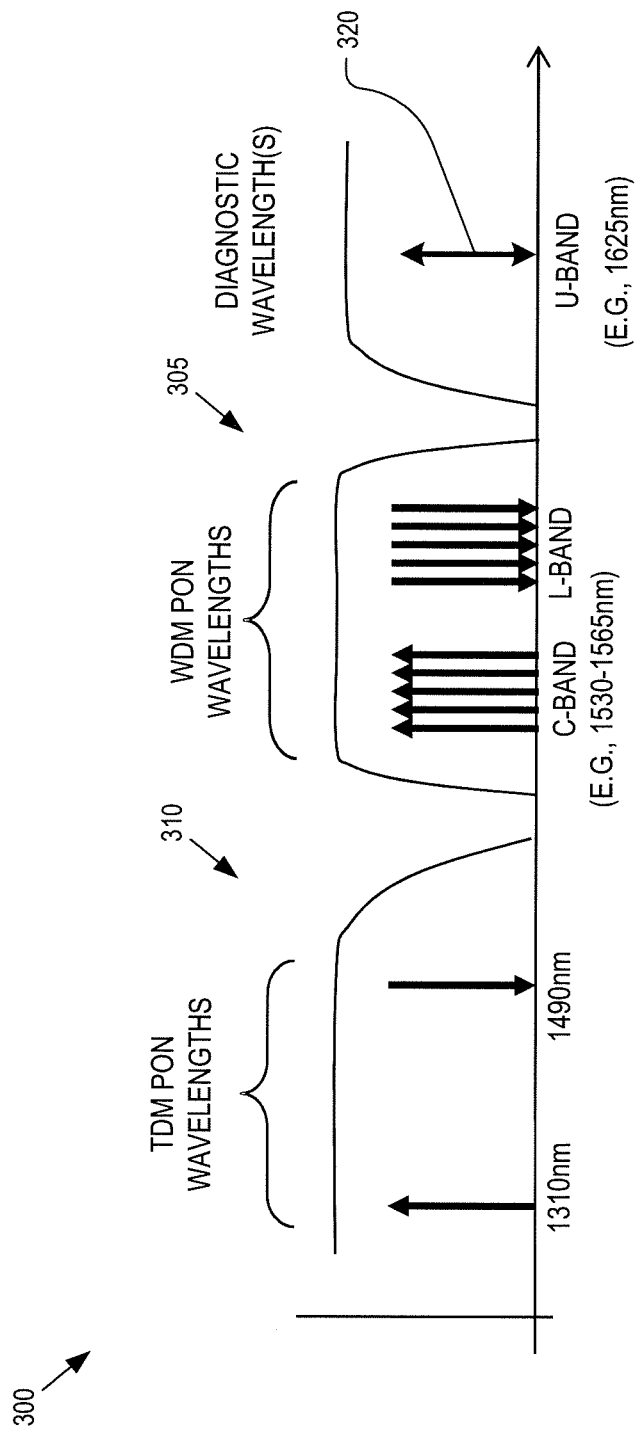
FIG. 3 is a chart illustrating communication and test wavelengths for optical access networks, in accordance with an embodiment of the disclosure.

ONUs 130 serve as the CPE endpoint at CPs 135 and perform the primary function of performing optical-to-electrical and electrical-to-optical conversions. Downstream WDM signals (signals propagating along the optical direction extending from CO to CP) received at RN 115 are de-multiplexed based upon wavelength and delivered to the appropriate fiber access line 120. Upstream WDM signals (signals propagating along the optical direction extending from CPs to CO) received at RN 115 are multiplexed together by RN 115 onto fiber trunk line 110 for combined delivery to CO 105. In one embodiment, RN 115 is implemented using a cyclic arrayed waveguide grating ("AWG"), and downstream and upstream wavelengths occupy different free spectral ranges (FSRs) of the cyclic AWG as shown in FIG. 3.

OTDR fault diagnosis starts with identifying loss of service with a particular CP 135. A loss of service may be a complete loss of communication with the particular ONU or an unacceptable degradation of the communication link. Once a particular CP is identified to have a loss of service, the test wavelength associated with that CP is determined and an optical test signal at the specified test wavelength is launched at the head end into fiber trunk line 110. The head end is then monitored for a reflection which may be analyzed to identify the location of the fiber fault.

Since WDM PON 100 uses an AWG in RN 115 to route specific wavelengths between CO 105 and CPs 135, a test signal having a single wavelength cannot be used to test all fiber access lines 120 for fiber faults. If multiple fiber access lines 120 are to be tested, then tunable OTDR unit 145 must adjust the test wavelength between each link test. Consequently, tunable OTDR unit 145 must be capable of tuning to wavelengths across the communication spectrum. This technique may be considered a brute force approach, since tunable OTDR unit 145 must be able to tune to a different wavelength for each CP 135 in order to test all fiber access lines 120. Each fiber access line 120 must be tested separately, one at a time, by tunable OTDR unit 145. Furthermore, without allocating a separate test wavelength for each CP 135, which wastefully allocates significant optical bandwidth to the test spectrum, in-service testing cannot occur. Rather, regular communication services must be temporarily disrupted to perform the fault diagnostics on a given fiber access line 120. Thus, the fiber diagnostic technique illustrated in FIG. 1 maps test wavelengths to specific ONUs 130. The test signal wavelengths cannot be remapped after deployment to service a different combination of ONUs 130, without also remapping the allocation of the communication wavelengths, and vice versa.

Since tunable OTDR unit 145 must be able to launch a large variety of test wavelengths across the communication spectrum into fiber trunk line 110, a broadband optical coupler, such as broadband optical coupler 150, is used. For example, broadband optical coupler 150 may be a 70/30 beam splitter that directs 30% of received optical power to/from tunable OTDR unit 145 while directing 70% of received optical power to/from OLT 140. The beam splitter operates across the communication spectrum, thereby reducing the optical power of upstream WDM signals received at OLT 140 and reducing the optical power of downstream WDM signals launched into WDM PON 100. As such, the receive circuitry in each of OLT 140 and ONUs 130 must be more sensitive, than would otherwise be necessary. Similarly, since only a portion of the reflected optical energy is directed into tunable OTDR unit 145, its receive circuitry must also be more sensitive than would be necessary if it received all optical energy of the test signal reflections. Tradeoffs between the OTDR dynamic range and the power budget penalty between OLT 140 and ONUs 130 could be difficult in such setup.

Figure 2:
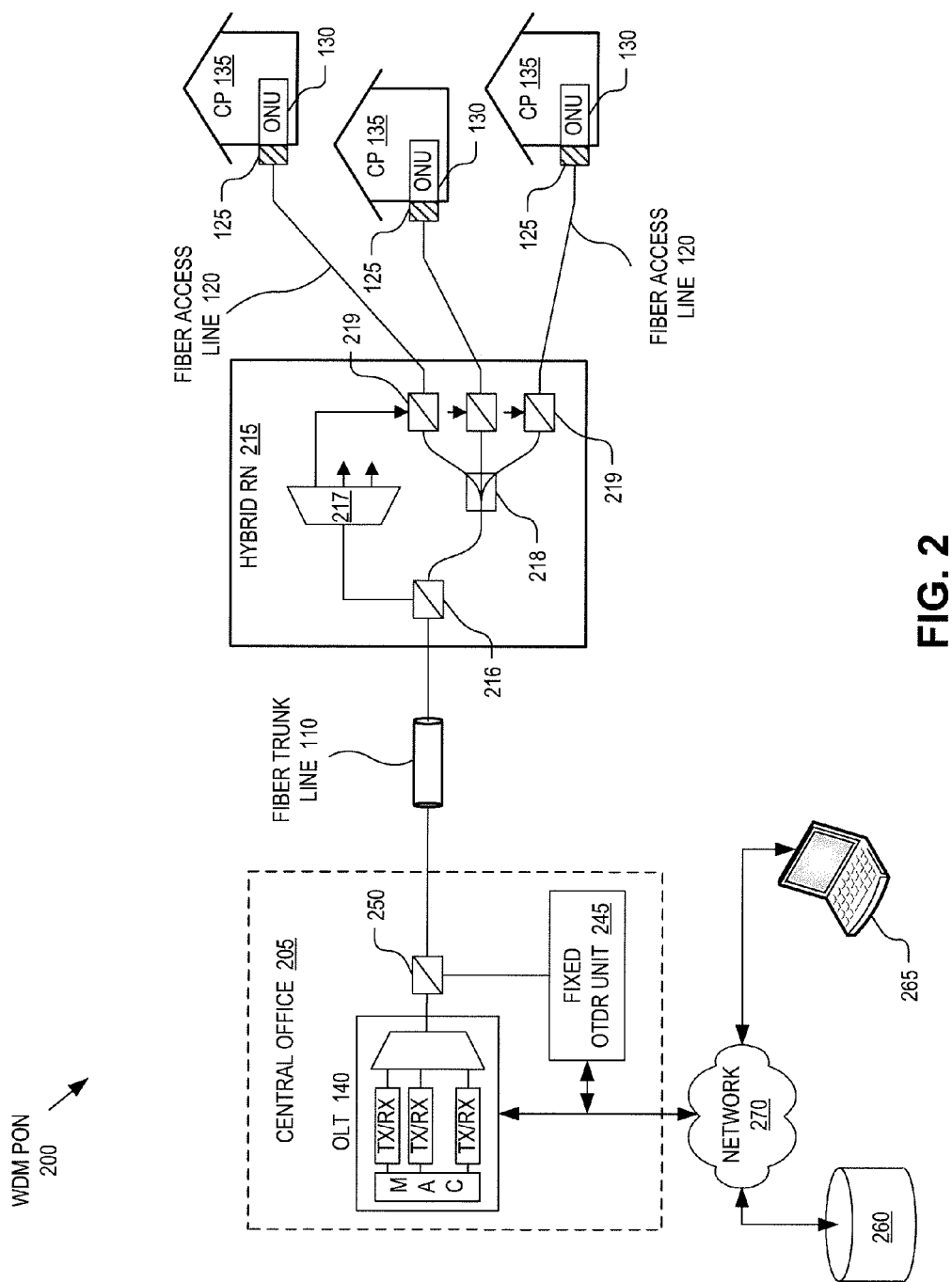
FIG. 2 is a functional block diagram of WDM PON provided with a fixed wavelength OTDR unit and a hybrid remote node, in accordance with an embodiment of the disclosure.

FIG. 2 is a functional block diagram of WDM PON 200 implemented with a fixed wavelength OTDR unit and a hybrid remote node, in accordance with an embodiment of the disclosure. The illustrated embodiment of WDM PON 200 includes a CO 205, a fiber trunk line 110, a hybrid remote node ("RN") 215, fiber access lines 120, demarcation devices 125, and ONUs 130 at CPs 135. The illustrated implementation of CO 205 includes OLT 140, a fixed wavelength OTDR unit 245, and a wavelength selective coupler 250.

During operation, the OTDR probe signal or test signal is combined with the downstream WDM signals onto fiber trunk line 110 using wavelength selective coupler 250. Wavelength selective coupler 250 may be implemented as a coarse wavelength division multiplexer (e.g., thin film reflective filter, wavelength selective evanescent coupler, etc.). Wavelength selective coupler 250 operates to pass substantially all optical power of the WDM signals to/from OLT 140 while substantially passing all optical power of the test signal to/from fixed wavelength OTDR unit 245. Since a broadband beam splitter is not used, the optical coupling is substantially less lossy than broadband coupler 150. The improved coupling efficiency relaxes the sensitivity requirements for the receive circuitry within OLT 140, fixed wavelength OTDR unit 245, and ONUs 130. It also relaxes the sensitivity/dynamic range requirements of the OTDR test-set.

WDM PON 200 includes a fiber diagnosis system that uses a hybrid AWG/power splitter structure to implement hybrid RN 215. The illustrated embodiment of hybrid RN 215 includes a wavelength selective coupler 216, a wavelength MUX/DEMUX 217, a power splitter 218, and wavelength selective couplers 219. In the downstream direction, hybrid RN 215 operates to separate the WDM signals from the test signal, power split the test signal onto each fiber access line 120, de-multiplex the WDM signals, and re-combine the de-multiplexed WDM signals with the power split test signal onto each fiber access line 120. In the upstream direction, hybrid RN 215 operates to separate the test signal reflections from their respective WDM signals, power combine the test signal reflections as a reflection signature, multiplex the WDM signals onto a single fiber link, and recombine the reflection signature with the multiplexed WDM signals onto fiber trunk line 110.

Wavelength MUX/DEMUX 217 may be implemented as an AWG. The sub-components of hybrid RN 215 may be discrete components assembled into a single module or onto a common substrate or integrated components combined into one or more passive planar lightwave circuits ("PLC"). Wavelength selective couplers 216 and 219 may be implemented using the same or similar optical coupler as wavelength selective coupler 250.

FIG. 3 is a chart 300 illustrating an example wavelength allocation or wavelength grid for the WDM signals and the test (or diagnostic) signal. It should be appreciated that FIG. 3 is merely demonstrative and other schemes of wavelength or band allocations may be allocated to the WDM signals and test signal than those illustrated. The WDM signals may be allocated according to a WDM-PON wavelength grid 305, which uses L-band for downstream and C-band for upstream transmissions. A TDM-PON wavelength grid 310, which includes just two wavelengths—an upstream wavelength and a downstream wavelength—has been illustrated for the sake of comparing TDM and WDM. In fact, with a proper optical multiplexing design, such as that described in U.S. patent application Ser. No. 13/205,055 entitled, "Migratable Wavelength Division Multiplexing Passive Optical Network" filed on Aug. 8, 2011, a TDM-PON and a WDM PON can coexist on the same fiber plant using hybrid RN 215. The WDM-PON wavelength grid 305 includes many upstream and downstream wavelengths (e.g., 32 upstream wavelengths and 32 downstream wavelengths having a 100 GHz wavelength spacing in C-band and L-band, respectively, as illustrated here). In another implementation, the WDM-PON wavelength grid 305 maybe allocated in a way such that each ONU 130 is allocated adjacent communication wavelengths for upstream and downstream transmission (not illustrated).

Chart 300 further illustrates a single test wavelength 320 (e.g., 1625 nm) for carrying the OTDR test signal. The single wavelength 320 is used for both the downstream and upstream directions, since the upstream test signal consists of reflections of the downstream test signal. Although FIG. 3 illustrates a single fixed test wavelength, in some embodiments two or more fixed test wavelengths may also be used.

Figures 4A, 4B:
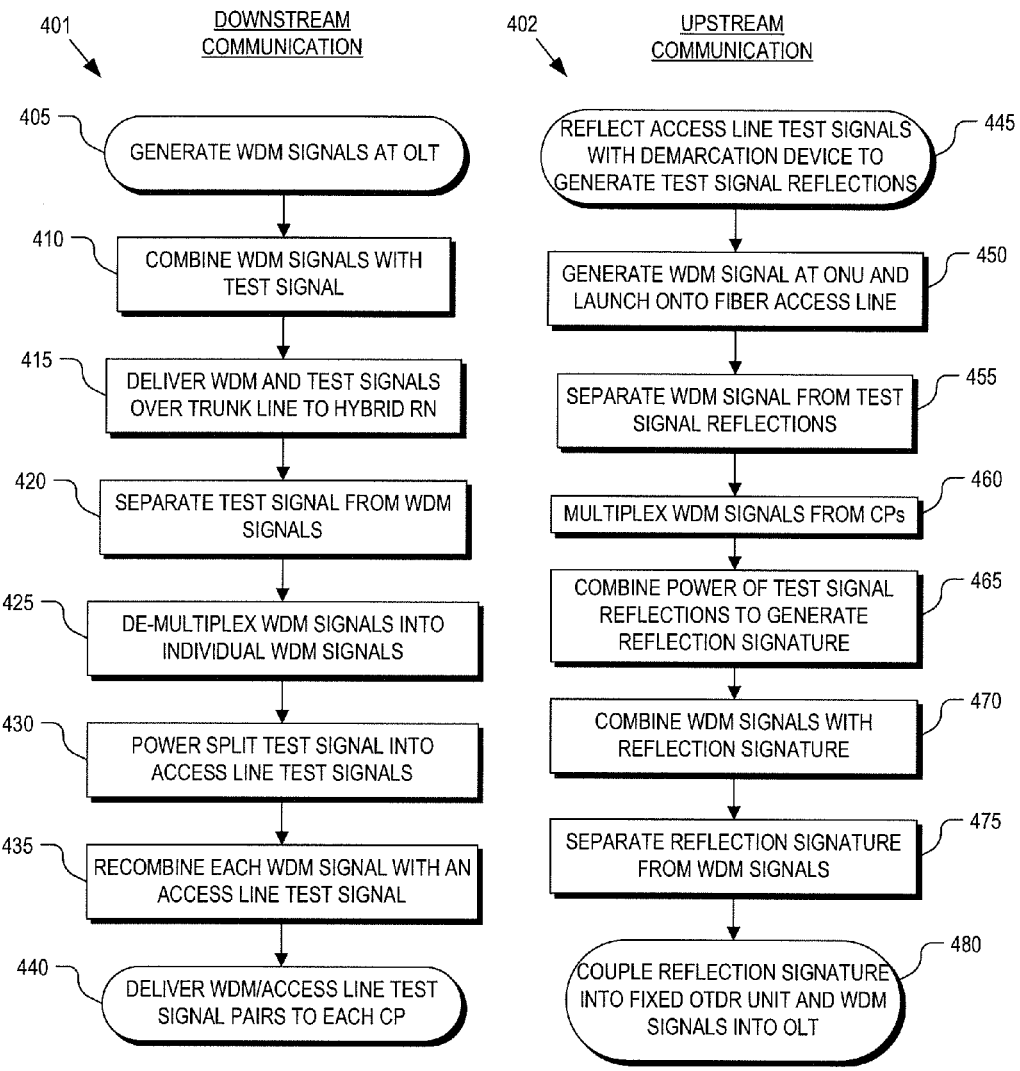
FIGS. 4A & 4B are flow charts illustrating a process for operating a WDM PON to deliver downstream and upstream communication services, in accordance with an embodiment of the disclosure.

FIGS. 4A & 4B are flow charts illustrating processes of operation of WDM PON 200, in accordance with an implementation of the disclosure. FIG. 4A illustrates a process 401 for downstream flowing communications, while FIG. 4B illustrates a process 402 for upstream flowing communications. The order in which some or all of the process blocks appear in process 401 or 402 should not be deemed limiting. Rather, one of ordinary skill in the art having the benefit of the present disclosure will understand that some of the process blocks may be executed in a variety of orders not illustrated, or in parallel.

In a process block 405, OLT 140 receives electrical signals from its MACs and generates optical signals for launching into WDM PON 200 as downstream WDM signals. In a process block 410, the OTDR test signal is combined with the WDM signals using wavelength selective coupler 250 and delivered to hybrid RN 215 via fiber trunk line 110 (process block 415). Wavelength selective coupler 250 may be implemented as a coarse wavelength division multiplexer (e.g., thin film reflective filter, wavelength selective evanescent coupler, etc.) that substantially directs all optical power of the WDM signals to/from OLT 140 while substantially directing all optical power of the test signal to/from fixed wavelength OTDR unit 245.

In a process block 420, the WDM signals and the test signal are separated at hybrid RN 215 using wavelength selective coupler 216. The WDM signals are directed to wavelength MUX/DEMUX 217 and routed to individual downstream ports of MUX/DEMUX 217 (process block 425) while the test signal is directed to power splitter 218. In process block 430, power splitter 218 splits the optical power of the test signal across the fiber access lines 120 as individual access line test signals. In one embodiment, the power split ratio is substantially equal across all fiber access lines 120. The individual downstream WDM signals (each having a different wavelength) are output on a separate downstream port of wavelength MUX/DEMUX 217. Each downstream port is optically coupled to a corresponding wavelength selective coupler 219. In a process block 435, each downstream WDM signal is recombined with an access line test signal on a given fiber access lines 120. The separately combined downstream WDM signal and access lines test signal pairs are then delivered to each CO 135 via fiber access lines 120. In this manner, a single OTDR test signal having a single wavelength can be used to simultaneously test fiber access lines 120 for one or more fiber faults. From the perspective of fixed wavelength OTDR unit 245 the hybrid RN 215 acts like a power splitting PON, while from the perspective of OLT 140 it operates as a wavelength division multiplexor supporting a plurality of pt-2-pt virtual links.

Upstream communications are now described in connection with process 402 (FIG. 4B). In a process block 445, the access line test signals are reflected at demarcation devices 125. These devices are reflective at the test signal wavelength, but substantially transparent at the WDM signal wavelengths. Of course, if a particular fiber access line 120 has a fault (e.g., break, pinch, bend, etc.), then the corresponding access line test signal will be reflected or partially reflected at the fault location, and may not reach a demarcation device 125. In a process block 450, ONU 130 of each CP 135 generates upstream WDM signals, which are launched onto respective fiber access lines 120. Each ONU 130 generates upstream WDM signals on an upstream wavelength allocated to the particular CP 135/ONU 130.

The combined test signal reflection and upstream WDM signals reach hybrid RN 215 along respective fiber access lines 120. In a process block 455, wavelength selective couplers 219 separates the upstream WDM signals from the test signal reflections. The upstream WDM signals from each fiber access line 120 are multiplexed (or combined) by wavelength MUX/DEMUX 217 onto a single optical link (process block 460). Similarly, the optical power of the test signal reflections are combined using power splitter/combiner 218 onto a single optical link to generate a reflection signature (process block 465). The multiplexed WDM signals and reflection signature are then combined by wavelength selective coupler 216 onto fiber trunk line 110 (process block 470) and delivered to CO 205.

Upon reaching CO 205, the reflection signature is separated from the multiplexed WDM signals by wavelength selective couplers 250 (process block 475). The reflection signature is directed into fixed wavelength OTDR unit 245, while the multiplexed WDM signals are directed to OLT 140 for decoding and conversion back into the electrical realm (process block 480).

Figure 5:
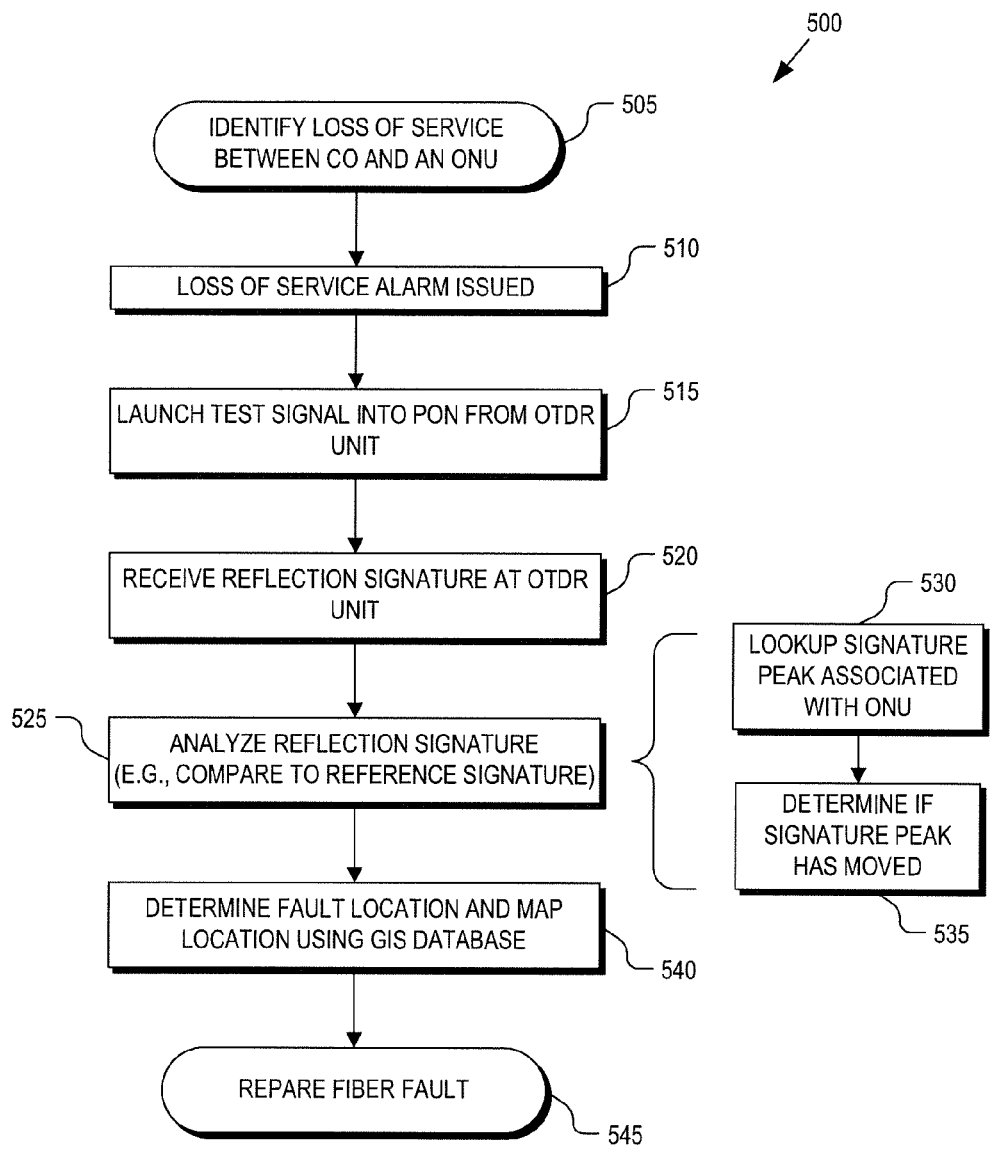
FIG. 5 is a flow chart illustrating an OTDR diagnostic process for in-service fiber fault testing of a WDM PON, in accordance with an embodiment of the disclosure.

FIG. 5 is a flow chart illustrating a process 500 of operation for testing WDM PON 200 using fixed wavelength OTDR unit 245 to identify and locate fiber faults, in accordance with an embodiment of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated.

In a process block 505, OLT 140 loses service with one or more ONUs 135. A loss of service may include a complete loss of communication or a threshold degradation in expected service characteristics. Since fixed wavelength OTDR unit 245 is capable of testing the entire WDM PON 200 with a single OTDR test signal pulse, it is not necessary to determine a specific test wavelength correlated to the particular ONU 130 experiencing a loss of service. Rather, identification of the particular ONU 130 facilitates looking up GIS route information from database 260 that associates the fiber run connecting the particular ONU 130 to OLT 140 and/or identifying a reflection peak in a reference reflection signature (discussed in greater detail below) associated with the particular ONU 130. In one embodiment, a unique ID (e.g., a MAC address of the failing ONU, a static IP address associated with the failing ONU, or other identifier uniquely associated with the failing ONU) associated with the particular ONU 130 experiencing loss of service is used to index into a lookup table stored in database 260 to acquire the appropriate diagnostic information.

In a process block 510, the loss of service results in issuance in a loss of service alarm. This alarm may automatically invoke a test protocol that commissions fixed wavelength OTDR unit 245 to perform an OTDR measurement of WDM PON 200 and/or may post a service warning to an administrator/technician. In response, the administrator may remotely commission fixed wavelength OTDR unit 245 to perform the OTDR measurement via remote terminal 265 communicating over network 270.

In a process block 515, fixed wavelength OTDR unit 245 launches an optical test signal, which is combined onto fiber trunk line 110 with any present WDM signals via wavelength selective coupler 250. The optical test signal propagates through fiber trunk line 110 to hybrid RN 215, where it is separated from the WDM signals, and power split between the fiber access lines 120 into access line test signals. The access lines test signals are individually recombined with corresponding WDM signals and routed into respective fiber access lines 120. The access line test signals are reflected by each demarcation devices 125 in fiber links without an optical break or blockage, while being reflected or partially reflected by a refractive index discontinuity at the fiber fault location. The individual reflections in each fiber access line 120 are recombined by hybrid RN 215 into a reflection signature of the entire WDM PON 200. In other words, the reflection signature is the sum of all reflections by demarcation devices 125 in fiber access lines 120 having no fiber fault and the reflection at the location of the fiber fault. Wavelength selective coupler 250 subsequently separates the reflection signature received at CO 205 from the upstream WDM signals (process block 520).

An example reflection signature 605 including multiple reflections having different intensity peaks at different distances, as observed by fixed wavelength OTDR unit 245, is illustrated in FIG. 6A. Although fixed wavelength OTDR unit 245 is testing pt-2-pt virtual links, reflection signature 505 is a snapshot indicative of the link integrity of the entire WDM PON 200. As a result, the aggregation of all the reflections from all the demarcation devices 125 forms a reflection signature, which includes a peak corresponding to the fiber fault. Power splitter 218 is also observed in the reflection signature as a splitting node having an associated signal drop due to the splitting loss.

In a process block 525, the reflection signature is analyzed to determine if a fiber fault exists, and if so, the fiber fault is located. In one embodiment, reflection signature 605 is analyzed by comparing it to a reference signature stored for WDM PON 200 (process block 530). FIG. 6B illustrates an example reference signature 610. Reference signature 610 may be obtained during testing conducted after installation of the initial fiber plant and/or during subsequent service intervals when new ONUs 130 are added to the WDM PON 200. If a new reflection peak is present in the newly acquired reflection signature 605 and an existing peak in the reference signature 610 is either moved, smaller, or gone, then a fiber fault can be assumed to be present in the associated fiber access link 120 (process block 535). If the newly acquired reflection signature 605 is identical to the stored reference signature 610, then it can be assumed that the loss of service is due to an error in the CPE and not in the fiber plant.

If a fiber fault is determined to be present, then the location of the fiber fault is determined in process block 540. The location can be determined by referencing GIS data detailing the location and length of the fiber routes and comparing that information to the distance associated with the fiber fault peak identified in reflection signature 605. The position or offset of each peak, including the fault peak, in reflection signature 605 correlates, via a round trip time delay and the propagation speed of light traveling within WDM PON 200, to a travel distance. Furthermore, knowledge of which ONU(s) 130 is/are experiencing the loss of service can also aid in eliminating healthy access fiber lines 120 and pin-pointing the fault location. In one embodiment, the location of the fiber fault is further mapped using a mapping program such as Google Earth™. Finally, in a process block 545, a technician can be dispatched to the fault location to repair the fiber fault.

The fiber diagnosis technique described above in connection with FIG. 2 maps the unique ID of a given ONU 130 to a distance or time delay of its associated reflection peak. This facilitates remapping of WDM signal wavelength allocations used by OLT 140 to communicate with ONUs 130 without affecting the test wavelength used for diagnosing faults. In contrast, the technique described in connection with FIG. 1 maps specific test wavelengths to specific ONUs 140. In this case, when an ONUs wavelength allocation is changed, test wavelength mappings must also be revised. Finally, the fiber diagnosis technique described in connection with FIG. 2 is a one-shot sees all CPs diagnostic procedure. In contrast, the technique described in connection with FIG. 1 is a one-shot sees one CP, potentially requiring multiple test pulses to fully analyze loss of service scenarios affecting multiple CPs simultaneously. In addition, the fiber diagnostic technique of FIG. 1 is a disruptive procedure, which cannot be conducted on a given fiber access line 120 simultaneously with bi-directional communication on that fiber access line 120.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method for detecting fiber faults in a wavelength division multiplexing ("WDM") optical access network, the method comprising:
    launching a test signal into a fiber trunk line linking a central office ("CO") to a remote node ("RN") of the WDM optical access network, the test signal having a first wavelength and generated by an optical time domain reflectometry ("OTDR") unit at the CO to simultaneously test a plurality of fiber access lines linking the RN to a corresponding plurality of customer premises ("CPs") for a fiber fault;
    separating the test signal from downstream WDM signals also delivered on the fiber trunk line to the RN;
    power splitting the test signal at the RN into a plurality of access line test signals;
    recombining each of the access line test signals with a corresponding one of the downstream WDM signals onto a corresponding one of the fiber access lines;
    receiving test signal reflections at the CO from the fiber access lines as a reflection signature, wherein the test signal reflections each have the first wavelength; and
    analyzing the reflection signature to identify a location of the fiber fault.

2. The method of claim 1, wherein the OTDR unit comprises a fixed wavelength OTDR unit capable of generating only a single wavelength optical test signal for simultaneously testing the plurality of fiber access lines.

3. The method of claim 1, wherein launching the test signal into the fiber trunk line comprises:
    combining the test signal with the downstream WDM signals onto the fiber trunk line using a wavelength selective optical combiner/separator, wherein the wavelength selective optical combiner/separator substantially passes all optical power of the test signal having the first wavelength to/from the OTDR unit while substantially passing all optical power of upstream WDM signals and the downstream WDM signals to/from an optical line terminal ("OLT") at the CO.

4. The method of claim 1, wherein analyzing the reflection signature to identify the location of the fiber fault comprises:
    comparing the reflection signature to a reference signature to identify differences between the reflection signature and the reference signature;
    using the identified differences along with geographic information system ("GIS") data regarding physical routes of each of the access fiber lines to identify the location of the fiber fault; and
    mapping the location of the fiber fault on a map for display on a screen.

5. The method of claim 4, wherein reflection peaks within the reference signature are indexed to corresponding CPs.

6. The method of claim 1, further comprising:
    separating the test signal reflections, each received at the RN on a corresponding one of the fiber access lines, from upstream WDM signals;
    combining the test signal reflections onto a single fiber link to form the reflection signature; and
    recombining the reflection signature with the upstream WDM signals received from each of the CPs onto the fiber trunk line.

7. The method of claim 6, wherein at least a portion of the test signal reflections are generated by wavelength selective reflectors positioned at each of the CPs, which function as demarcation devices signifying a boundary between customer premise equipment ("CPE") and communication service provider equipment.

8. The method of claim 1, wherein the WDM optical access network comprises a WDM passive optical network ("PON").

9. The method of claim 8, further comprising:
    adding additional WDM signal wavelengths used by an optical line terminal ("OLT") at the CO to communicate with additional optical network units ("ONUs") at the CPs without altering the first wavelength of the test signal; and
    testing the fiber access lines, including those coupled to the additional ONUs, with the test signal having the first wavelength.

10. Non-transitory machine-readable storage media providing instructions that, when executed by one or more machines, will cause the one or more machines to perform operations comprising:
    identifying loss of service between a central office ("CO") and a given optical network unit ("ONU") of a plurality of ONUs coupled to the CO via a wavelength division multiplexing ("WDM") passive optical network ("PON") that delivers communication services to customer premises ("CPs");
    in response to the identifying, initiating an optical time domain reflectometry ("OTDR") unit at the CO to launch a test signal having a first wavelength into the WDM PON to simultaneously test fiber access lines linking a remote node of the WDM PON to the CPs for one or more fiber faults, wherein the remote node de-multiplexes and multiplexes WDM data signals communicated between the CO and the CPs on the fiber access lines while power splitting the test signal onto the fiber access lines;
    receiving test signal reflections from each of the fiber access lines as a reflection signature, the test signal reflections each having a respective delay and all having the first wavelength; and
    analyzing the reflection signature to identify a location of the fiber fault between the CO and the given ONU.

11. The non-transitory machine-readable storage media of claim 10, wherein the OTDR unit comprises a fixed wavelength OTDR unit capable of generating only a single wavelength optical test signal for simultaneously testing the plurality of fiber access lines.

12. The non-transitory machine-readable storage media of claim 10, wherein analyzing the reflection signature to identify the location of the fiber fault comprises:
   comparing the reflection signature to a reference signature to identify differences between the reflection signature and the reference signature;
   using the identified differences along with geographic information system ("GIS") data regarding physical routes of each of the access fiber lines to identify the location of the fiber fault; and
   mapping the location of the fiber fault on a map for display on a screen.

13. The non-transitory machine-readable storage media of claim 10, wherein reflection peaks within the reference signature are indexed to corresponding CPs.

14. The non-transitory machine-readable storage media of claim 10, further providing instructions that, when executed by the one or more machines, will cause the one or more machines to perform further operations, comprising:
   adding additional WDM signal wavelengths used by an optical line terminal ("OLT") at the CO to communication with additional ONUs at the CPs without altering the first wavelength of the test signal; and
   testing the fiber access lines, including those coupled to the additional ONUs, with the test signal having the first wavelength.

15. A wavelength division multiplexing ("WDM") passive optical network ("PON"), comprising:
   an optical line terminal ("OLT") located at a central office ("CO") to deliver communication services to customer premises ("CPs") via WDM signals whereby each CP is allocated a portion of the WDM signals each having a different wavelength;
   an optical time domain reflectometry ("OTDR") unit located at the CO to generate an test signal having a first wavelength; and
   a remote node coupled to the OLT and the OTDR unit via a fiber trunk line and to the CPs via fiber access lines, the remote node including a power splitter/combiner and a wavelength multiplexer/de-multiplexer ("MUX/DE-MUX"), the power splitter/combiner coupled to the fiber trunk line to power split the test signal onto the fiber access lines to simultaneously test the fiber access lines and the wavelength MUX/DEMUX coupled to the fiber trunk line to selectively route the WDM signals to the fiber access lines based upon the different wavelengths.

16. The WDM PON of claim 15, wherein the OTDR unit comprises a fixed wavelength OTDR unit and wherein the fixed wavelength OTDR unit and the remote node are coupled to simultaneously pass the test signal having the first wavelength to all of the fiber access lines of the WDM PON to simultaneously test all of the fiber access lines of the WDM PON for a fiber fault.

17. The WDM PON of claim 16, wherein the remote node further comprises:
   an upstream wavelength selective coupler coupled between the fiber trunk line and the wavelength MUX/DEMUX and the power splitter/combiner, the upstream wavelength selective coupler having a wavelength filter that routs the WDM signals between the fiber trunk line and the wavelength MUX/DEMUX and routes the test signal between the fiber trunk line and the power splitter/combiner; and
   a plurality of downstream wavelength selective couplers each coupled to a downstream port of the wavelength MUX/DEMUX and a downstream port of the power splitter/combiner.

18. The WDM PON of claim 17, wherein the wavelength MUX/DEMUX comprises an arrayed waveguide grating ("AWG").

19. The WDM PON of claim 17, wherein the upstream wavelength selective coupler, the plurality of downstream wavelength selective couplers, the power splitter/combiner, and the wavelength MUX/DEMUX are integrated into a single module.

20. The WDM PON of claim 15, further comprising:
   a wavelength selective coupler disposed at the CO between the fiber trunk line and the OLT and the OTDR unit, wherein the wavelength selective optical coupler substantially passes all optical power of the test signal having the first wavelength to/from the OTDR unit while substantially passing all optical power of the WDM signals to/from the OLT.

21. The method of claim 1 wherein power splitting the test signal at the RN into the plurality of access line test signals comprises power splitting the test signal at the RN into the plurality of access line test signals to simultaneously test all of the fiber access lines communicatively coupled to receive the downstream WDM signals via a single wavelength multiplexer/de-multiplexer ("MUX/DEMUX") within the RN.

* * * * *